US012214956B1

(12) United States Patent
Hager et al.

(10) Patent No.: US 12,214,956 B1
(45) Date of Patent: Feb. 4, 2025

(54) ENHANCED SELF-CLOSING LID FOR CONTAINERS

(71) Applicant: Amazon Technologies, Inc., Seattle, WA (US)

(72) Inventors: Joseph C. Hager, Seattle, WA (US); Claire Gottschalk, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 17/899,558

(22) Filed: Aug. 30, 2022

(51) Int. Cl.
B60P 3/00 (2006.01)
B65D 88/12 (2006.01)
B65D 90/00 (2006.01)

(52) U.S. Cl.
CPC .......... B65D 90/0086 (2013.01); B60P 3/007 (2013.01); B65D 88/12 (2013.01)

(58) Field of Classification Search
CPC ...... B65D 5/66; B65D 5/6602; B65D 88/126; B65D 90/0086; B65D 43/24; B65D 43/164; B65D 43/26; B60P 3/007; B60P 7/02; G06Q 10/083; G06Q 10/0832; B62B 3/004; G05D 1/0011; G05D 1/0212; G05D 1/0088
See application file for complete search history.

(56) References Cited

U.S. PATENT DOCUMENTS

| 849,551 | A | * | 4/1907 | Lutterman | B42F 17/02 220/523 |
| 4,282,983 | A | * | 8/1981 | Swartzbaugh | B65D 43/164 220/840 |
| 4,460,110 | A | * | 7/1984 | Helander | B65D 90/623 222/491 |
| 5,048,715 | A | * | 9/1991 | Wolff | B65D 43/168 220/840 |

(Continued)

FOREIGN PATENT DOCUMENTS

| CA | 2248677 | A1 | * | 9/1997 | |
| CN | 112722566 | A | * | 4/2021 | ............. B65D 43/24 |

(Continued)

OTHER PUBLICATIONS

Hattori et al., Carrying Box, Jun. 21, 2012, EPO, JP 2012-116325 A, Machine Translation of Descripiton (Year: 2012).*

Primary Examiner — James A English
(74) Attorney, Agent, or Firm — Eversheds Sutherland (US) LLP

(57) ABSTRACT

A container may include a cargo bay for holding items; a lid able to slide between a closed position to an open position relative to the cargo bay; a check strap operatively connected to the lid and able to move vertically in a first direction toward the lid as the lid slides from the closed position to the open position, and to move vertically in a second direction opposite the first direction as the lid slides from the open position to the closed position; and arms operatively attached to rollers and to one or more tension devices, (Continued)

wherein when the check strap moves vertically in the first direction, the check strap separates the rollers and causes the arms to pull the one or more tension devices, and wherein when the check strap moves vertically in the second direction, the one or more tension devices cause second rotation of the arms.

20 Claims, 10 Drawing Sheets

(56) References Cited

U.S. PATENT DOCUMENTS

| | | | |
|---|---|---|---|
| 6,394,496 B1 * | 5/2002 | Piona | B61D 5/00 |
| | | | 280/830 |
| 9,260,898 B2 * | 2/2016 | Soma | E05D 7/105 |
| 10,724,264 B2 * | 7/2020 | Clark | E04H 4/14 |
| 2022/0019213 A1 * | 1/2022 | Haghighat Kashani | |
| | | | G05D 1/0231 |

FOREIGN PATENT DOCUMENTS

| | | | | |
|---|---|---|---|---|
| EP | 2622990 A2 * | 8/2013 | | A45D 40/221 |
| JP | 2012116325 A * | 6/2012 | | |

* cited by examiner

FIGs. 10A, 10B, and 10C

ENHANCED SELF-CLOSING LID FOR CONTAINERS

BACKGROUND

When people put items into and remove items from a container, they may have to hold a lid of the container to prevent the lid from closing. This can be a problem when a person needs their hands to hold the item. In addition, once a person has opened the lid to put an item into or remove an item from the container, the person may forget to close the lid. It is desirable for a container lid to not be damaged when a person attempts to open a container lid too far or pushes the container lid with too much force.

Figure 1:
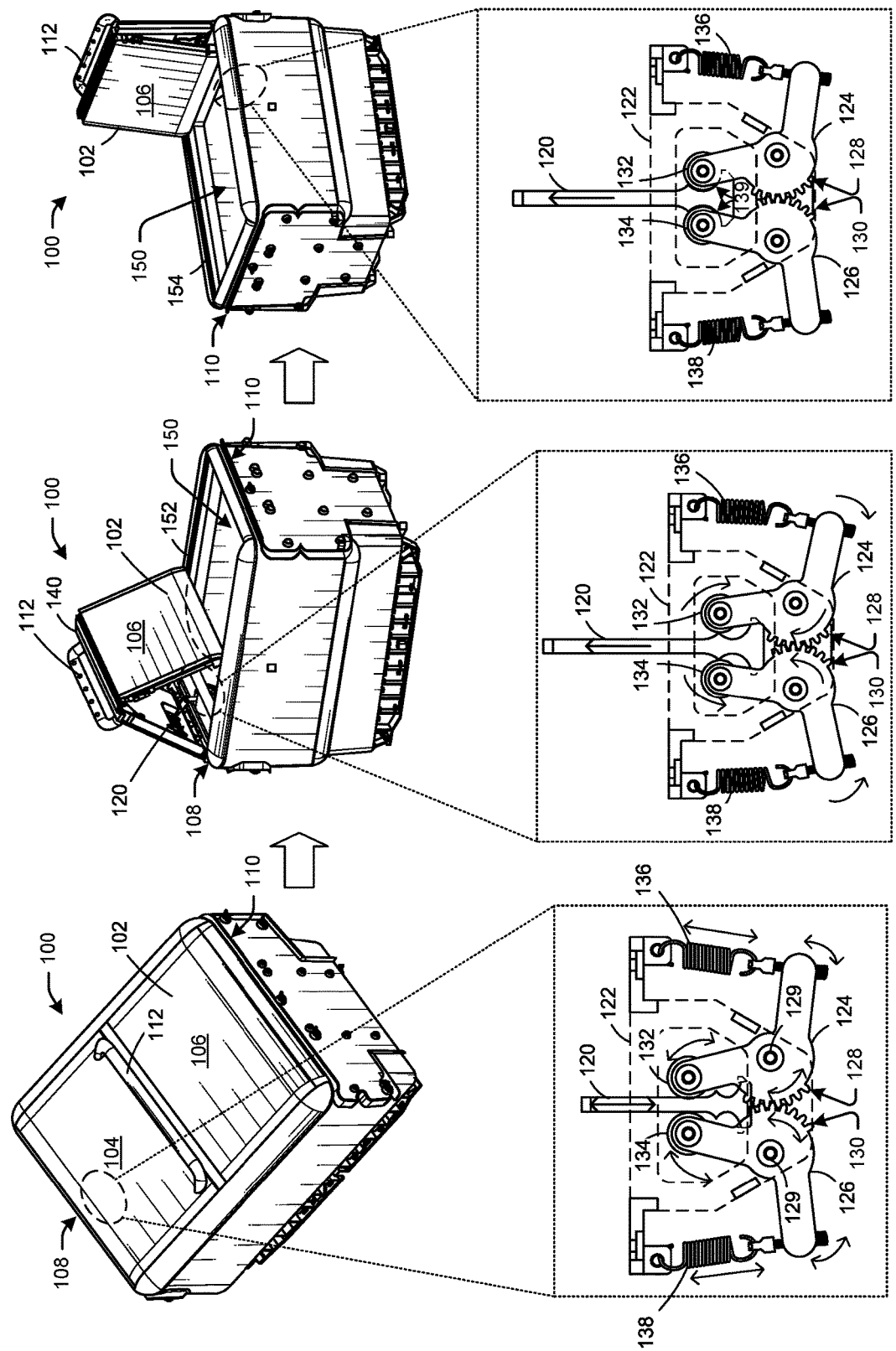
FIG. 1 illustrates perspective views of a container with a self-closing lid moving from a closed position to an open position, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide an enhanced self-closing lid for containers.

Robots, including autonomous vehicles, are becoming more common, including for delivery of items. An autonomous delivery vehicle (e.g., an autonomous ground vehicle) may allow a person to load items into the autonomous delivery vehicle, transport the items to one or more locations, and then allow another person to unload the items from the autonomous delivery vehicle. Autonomous delivery vehicles may include lids to ensure that items remain contained within an autonomous delivery vehicle, and to protect items from weather elements.

However, lids on autonomous delivery vehicles may close on a person while trying to put an item into or remove an item from an autonomous delivery vehicle. In addition, people may forget to close a lid of an autonomous delivery vehicle after putting an item into or removing an item from an autonomous delivery vehicle, and people may damage the lid by opening the lid too far or pushing/pulling the lid with too much force.

Some car doors, for example, have a resistance and locking mechanism to hold a door open. Some car doors may use a strap that connects the door to the chassis so that when the door is opened, the strap may tighten and prevent the door from opening too far. However, car doors and container closures may lack the ability to self-release the tension and remove the detent to allow the door or a lid to self-close.

There is therefore a need for an enhanced autonomous vehicle with a self-closing lid.

In one or more embodiments, a container may include a mechanism that may hold a lid at one or more open positions, limit the movement of the lid (e.g., to prevent lid damage), and enables self-closure of the lid. The mechanism may apply adjustable tension and may be used with or without actuation. The mechanism may connect to the lid with a check strap detent mechanism having a curved profile that extends between two tensioned rollers. The motion of the lid may be controlled by the tension on the tension rollers and by the shape of the check strap. Self-closure of the lid may occur by overcoming the tension or releasing the tension. The tension mechanism may include two arms (e.g., on opposing sides of the container) synchronized to one another via a set of gears such that movement of one arm results in movement of the other arm, allowing the mechanism to use one or more springs and/or actuators to apply the tension.

In one or more embodiments, the tension rollers and the shape of the check strap may control the amount of hold-open force (e.g., detent) is for the lid, and may limit the angle at which the lid may stop rotating (e.g., preventing over-rotation of the lid). As the lid rotates from a close position to open, the check strap may move up vertically until the check strap pushes the tension rollers outward (e.g., separates the tension rollers from one another based on the shape of the check strap), resulting in increased tension (e.g., from one or more springs or actuators). The check strap may include one or more curved profiles that allows for the check strap to hold the rollers in one or more positions that correspond to the lid being open, and the bottom of the check strap may be shaped to prevent the check strap from being lifted beyond a maximum open position (e.g., preventing the lid from opening further). The check strap may be a plastic material (e.g., not an elastomer or leather).

In one or more embodiments, the lid may be a bi-fold lid with multiple hinges. For example, one hinge may allow the lid to rotate at one end, and another hinge may separate two portions of the lid, allowing the lid to fold as it opens. As a result, the range of the bi-fold lid may be half the range of motion (e.g., to open the lid) as compared to a full lid, which helps people with mobility and/or strength limitations. The lid is therefore designed to be easy to open, but without closing on a person whose hands are inside of the container. In addition, a full, single-hinge lid may be exposed to more wind as it opens, and therefore may be more likely to be blown closed than the bi-fold lid.

In one or more embodiments, the front corners of the lid may be on respective tracks spanning a portion of the length of the container so that the front corners of the lid may slide along the tracks, opening the lid as it folds and slides (and rotates along the two hinges described above). The tracks may stabilize the lid and its sliding motion. Because of the horizontal sliding of the lid, the container may be accessed from the side or the front. In some embodiments, the tracks may be curved (e.g., like a garage door track), allowing for the lid to slide and open in a different manner. In some embodiments, the lid may be attached to one or more dampers (e.g., unidirectional dampers) to control the self-closure of the lid (e.g., once a force is applied that overcomes the tension and causes the lid to start to close). One or more actuators may be used to apply force to the lid to overcome the tension and initiate the self-closure of the lid.

In one or more embodiments, the lid may include a sensor that indicates when the lid is closed and may be locked. The lid may include a magnet, and the sensor may detect the presence of the magnet as an indicator that the lid is closed. The lock may be applied automatically based on a timer (e.g., to allow for sufficient time for a person to remove all items before locking the lid) or based on a detection that items have been removed.

In one or more embodiments, the lid may have a control board to control locking and optional operation of an actuator to close the lid. The control board also may control interior lighting to light the cargo bay of the container. The lid also may include a three-dimensional hall sensor that may detect a presence of a magnet positioned at the axis of rotation of the lid. As the lid rotates open and closed, the hall sensor may detect the magnet, allowing for an estimate of the angle of the lid, and a corresponding position/orientation of the lid, at a given time. Other sensors may be used, such as a potentiometer, to detect the magnet, allowing for an estimated angle and position of the lid. The lid also may include a control board with communications circuitry. For example, the communications circuitry may include LTE, Bluetooth, and GPS positioning circuitry (e.g., to communicate with other devices to send delivery status updates, receive delivery instructions, provide positioning data, and the like).

In one or more embodiments, the lid may be designed to protect against water entering the cargo bay of the container. For example, as the lid slides and folds open, the cargo bay may be exposed, allowing for water on the lid to fall into the cargo bay and onto the contents of the cargo bay. To prevent any water or other liquid from running off of the lid into the cargo bay as the lid opens, the lid may include a gutter system to receive liquid run-off from the lid as the lid opens, and allow the liquid to run-off outside of the container. The lid also may have a curved profile to allow water to run off of the top surface of the lid.

In one or more embodiments, a center hinge between the two portions of the folding lid may include a flexible material (e.g., a baffle) to prevent water from entering the cargo bay between the folding portions of the lid, and to prevent pinch points as the lid folds.

In one or more embodiments, the container may be a portion of a robot, such as an autonomous vehicle for delivering packages. The robot may include wheels to roll the container so that the container may travel. The container may be operatively attached to the wheels to form an autonomously moving container with the self-closing lid as described herein.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates perspective views of a container 100 with a self-closing lid 102 moving from a closed position to an open position, in accordance with one or more example embodiments of the present disclosure.

Referring to FIG. 1, the self-closing lid 102 may be a bi-folding lid with multiple portions (e.g., portion 106 proximal to a first end 108 of the container 100, and portion 104 proximal to a second end 110 of the container 100). The self-closing lid 102 may include a handle 112 for pulling and pushing the self-closing lid 102 (e.g., to cause the self-closing lid 102 to open and close). On the left-most view of the self-closing lid 102 in FIG. 1, the self-closing lid 102 is in a closed position. In the right-most view of the self-closing lid 102 of FIG. 1, the self-closing lid 102 is in an open position. In the middle view of the self-closing lid 102 of FIG. 1, the self-closing lid 102 is shown as moving between the closed and open positions.

Figure 2:
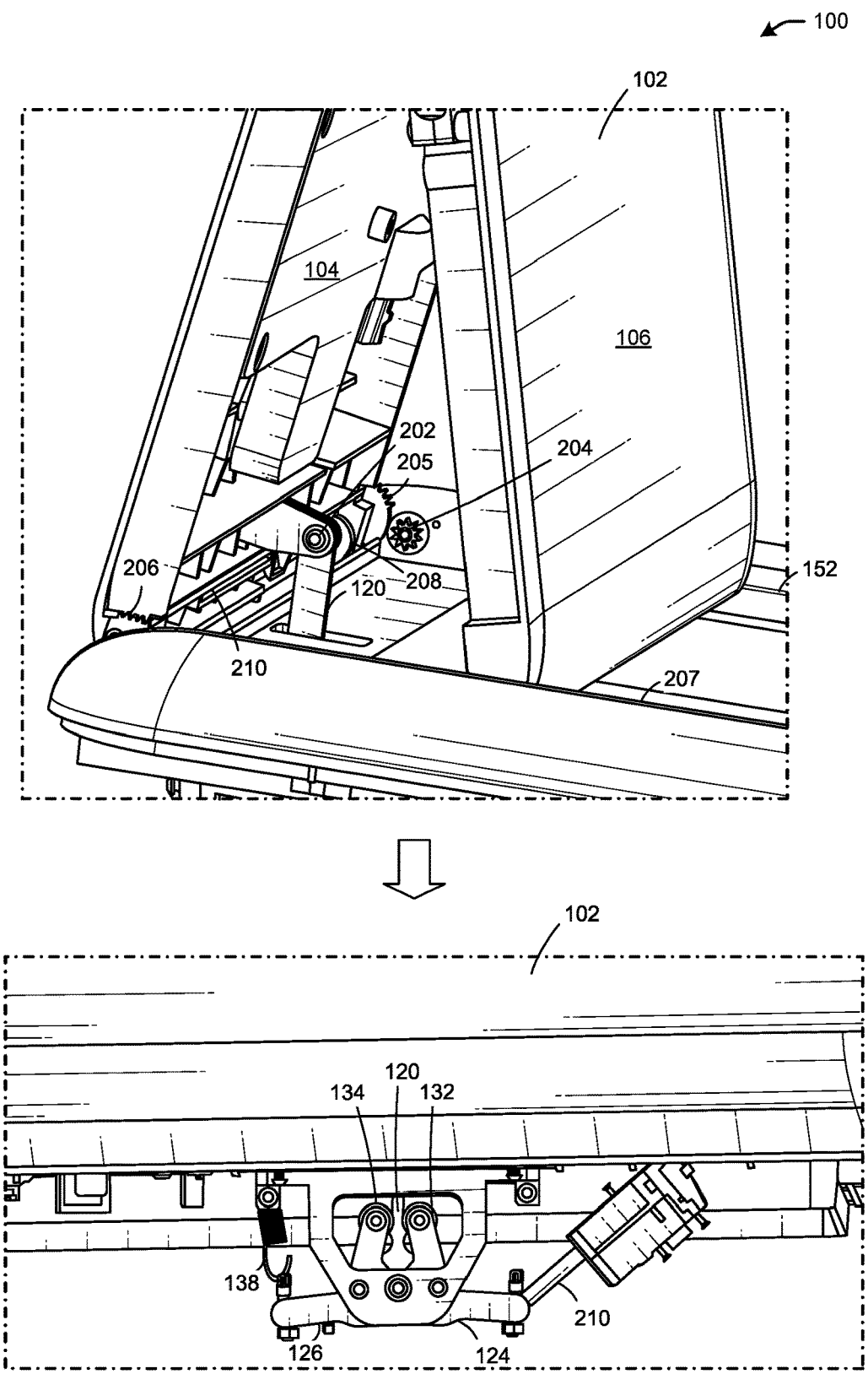
FIG. 2 illustrates perspective views of portions of the container of FIG. 1 in which the self-closing lid is moving from a closed position to an open position, in accordance with one or more example embodiments of the present disclosure.

Still referring to FIG. 1, the container 100 may include a check strap 120 (e.g., check strap detent mechanism) operatively connected to the container 100 as shown in more detail in FIG. 2. The check strap 120 may move vertically, toward the self-closing lid 102 when the self-closing lid 102 opens, and away from the self-closing lid 102 (e.g., toward the ground) when the self-closing lid 102 closes. The check strap 120 may be positioned within a frame 122. Operatively attached to the frame 122 may be two arms (e.g., arm 124 and arm 126), which may include gears (e.g., gears 128 and gears 130, respectively). The arms may be rotatable (e.g., about pivot points 129) and may rotate as the gears 128 and the gears 130 may engage one another. The arm 124 may include a roller 132, and the arm 126 may include a roller 134. When the check strap 120 is lifted vertically toward the self-closing lid 102 (e.g., as the self-closing lid 102 opens), the check strap 120 may cause separation between the roller 132 and the roller 134 by pushing them apart, causing rotation of the arm 126 and the arm 124 via engagement of the gears 128 and 130. As the arm 124 and the arm 126 rotate downward due to the separation of the rollers 132 and 134 as the self-closing lid 102 opens, tension devices (e.g., tension device 136 attached to the frame 122 and the arm 124, and tension device 138 attached to the frame 122 and the arm 126) may be pulled downward (e.g., away from the self-closing lid 102), causing tension. The curvature of the check strap 120 may cause a detent 139 in the tension force applied by the tension devices as the arms move downward and the self-closing lid 102 opens. The detent 139 may prevent the self-closing lid 102 from opening further (e.g., and potentially damaging the self-closing lid 102 and/or the container 100). To close the self-closing lid 102, the detent 139 force needs to be overcome (e.g., by applying a force to the self-closing lid 102, either via the handle 112 or using an actuator) to allow for the self-closing lid 102 to move back to the closed position. In this manner, the detent 139 may prevent the self-closing lid 102 from closing on a user while putting items into or removing items from a cargo bay 150 of the container 100.

Still referring to FIG. 1, the self-closing lid 102 may move slidably along respective tracks 152 and 154, which may be horizontal in parallel (e.g., allowing the self-closing lid 102 to slide axially between the open and closed positions), or may be curved (e.g., like a garage door, as indicated by the dashed lines of the track 152).

In one or more embodiments, the check strap 120 may be a solid material (e.g., rather than a flexible belt material), and therefore may be referred to as a check strap device. Because of the solid material of the check strap 120 and its curved profile, as the check strap 120 is lifted toward the self-closing lid 102 (e.g., the middle drawing in FIG. 1), the curved profile of the check strap 120 may cause the rollers 132 and 134 to separate from one another until the detent 139 is created (e.g., the right-most drawing in FIG. 1), allowing the self-closing lid 102 to remain open until a force is applied to the self-closing lid 102, forcing the check strap 120 to move downward, overcoming the detent 139 and releasing the tension from the tension devices 136 and 138. In this manner, the detent 139 may allow the self-closing lid 102 to remain open while a person places objects into or removes objects from the cargo bay 150, and the tension from the tension devices 136 and 138 may allow the self-closing lid 102 to self-close.

In one or more embodiments, the cargo bay 150 may be a single storage compartment, or may be divided into multiple storage compartments.

FIG. 2 illustrates perspective views of portions of the container 100 of FIG. 1 in which the self-closing lid 102 is moving from a closed position to an open position, in accordance with one or more example embodiments of the present disclosure.

Referring to FIG. 2, a connection 202 of the check strap 120 to the self-closing lid 102 is shown. As the self-closing lid 102 moves from a position to an open position, similar to as shown in FIG. 1, the portion 104 of the self-closing lid 102 may lift the check strap 120, causing the separation of the rollers 132 and 134, and eventually the detent 139 as shown in FIG. 1. Because of the connection 202 of the check strap 120 to the self-closing lid 102, the check strap 120 may drop vertically (e.g., toward the ground) when the self-closing lid 102 closes and the portion 104 lowers. Also shown in FIG. 2 are a damper 204 for controlling the closing of the self-closing lid 102 by engaging gears 205 of the self-closing lid 102. The damper 204 may be replicated on the opposite side of the container 100 to engage gears 206. In addition to the tracks 152, tracks 207 on the opposite side of the container 100 may be parallel to the tracks 152 to allow for sliding of the portion 106 of the self-closing lid 102. A magnet 208 also may be operatively connected to the self-closing lid 102 to allow for sensor detection of the orientation of the self-closing lid 102 as explained further herein. In FIG. 2, instead of the tension device 136 of FIG. 1 being a spring, the tension device 136 may be replaced with another tension device—an actuator 210 as shown. Any combination of springs and actuators may be used to represent the tension devices 136 and 138 of FIG. 1. The portion 104 of the self-closing lid 102 may rotate about a hinge 210 to allow the self-closing lid 102 to open.

Figure 3:
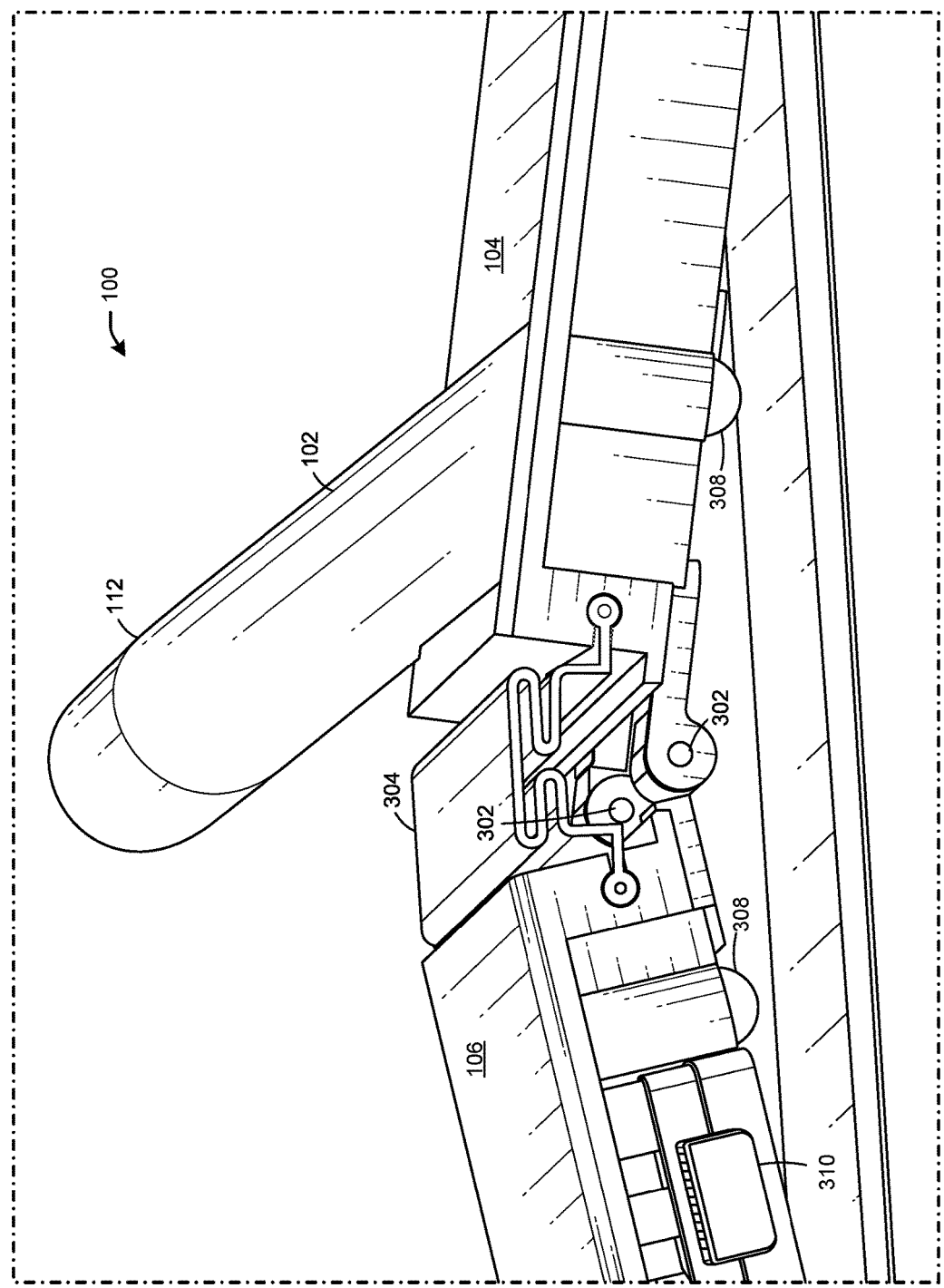
FIG. 3 illustrates a perspective view of a folding portion of the self-closing lid of FIG. 1, in accordance with one or more example embodiments of the present disclosure.

FIG. 3 illustrates a perspective view of a folding portion of the self-closing lid 102 of FIG. 1, in accordance with one or more example embodiments of the present disclosure.

Referring to FIG. 3, the portions 104 and 106 of the self-closing lid 102 may be separated by hinges 302 to make the self-closing lid a bi-folding lid. To protect against pinching and to prevent water seepage, a baffle 304 may be arranged in between the portions 104 and 106 of the self-closing lid 102 as shown. The baffle 304 may be rubber or another flexible material. The self-closing lid 102 may include bump stops 308 for softening the closure of the self-closing lid 102, and a locking mechanism 310 (e.g., functioning as a latch that may fit within FIG. 4 illustrates a perspective view of a portion of the container 100 and the self-closing lid 102 of FIG. 1, in accordance with one or more example embodiments of the present disclosure.

Figure 4:
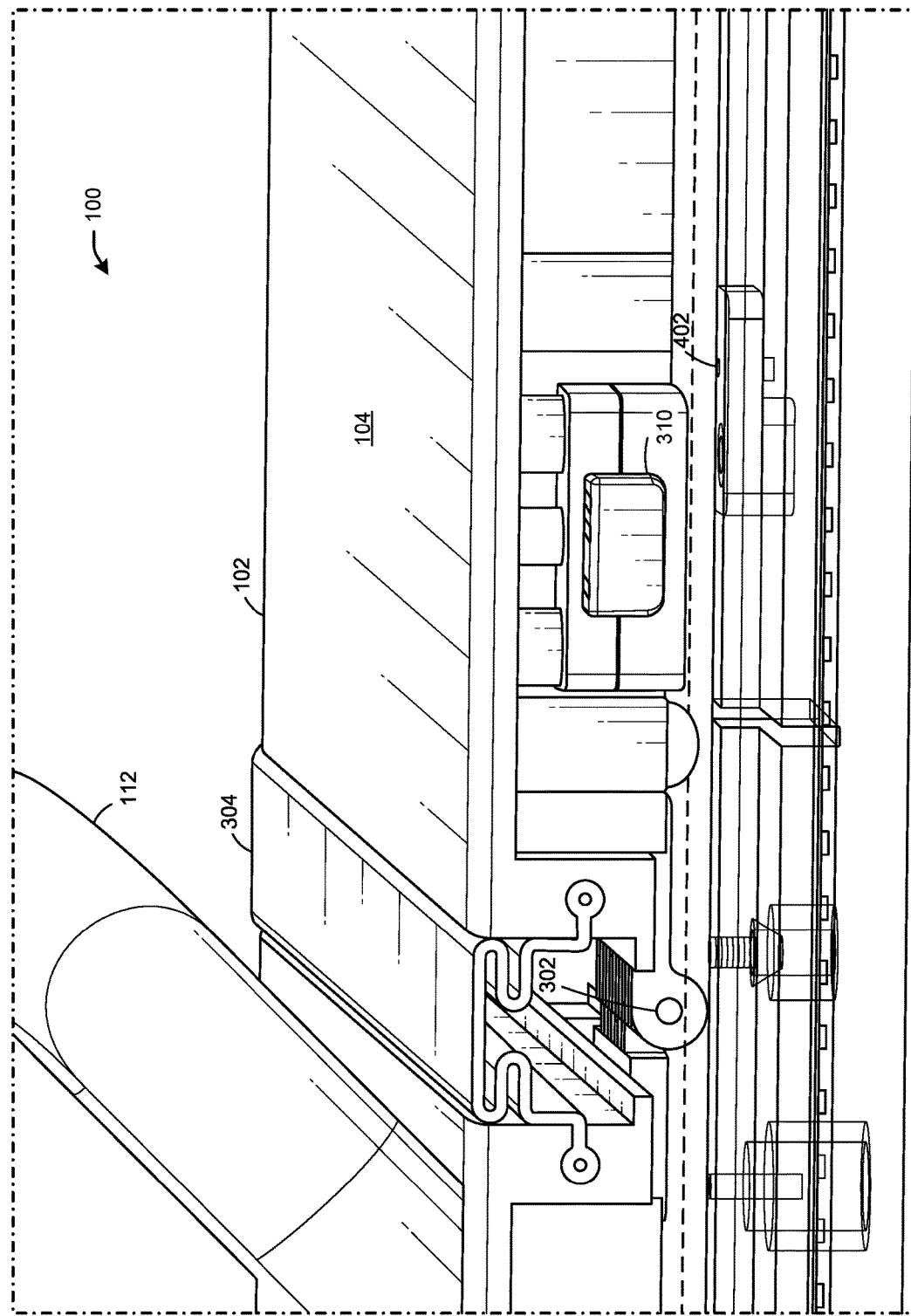
FIG. 4 illustrates a perspective view of a portion of the container and the self-closing lid of FIG. 1, in accordance with one or more example embodiments of the present disclosure.
Figure 7:
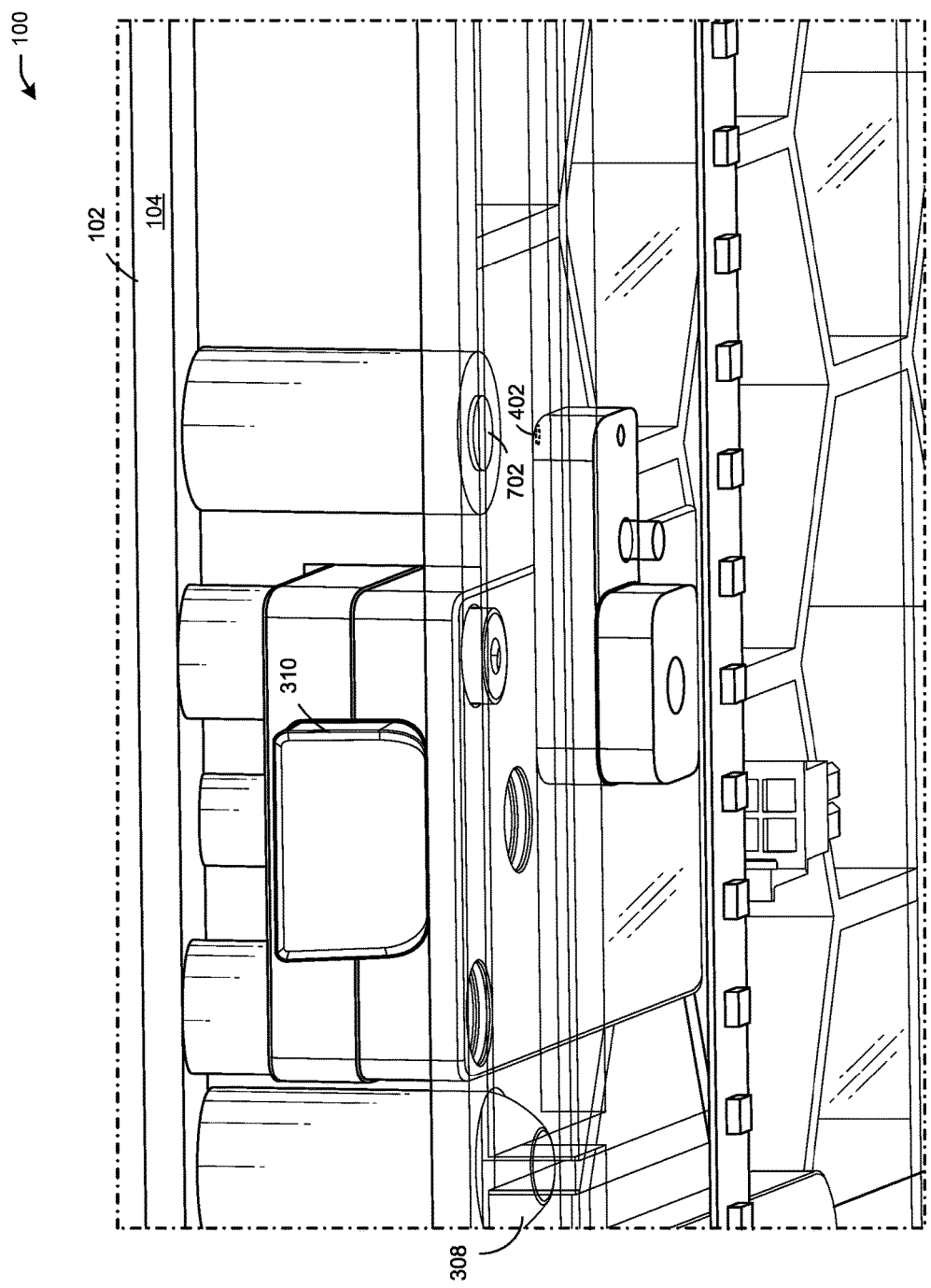
FIG. 7 illustrates a perspective view of a portion of the self-closing lid of FIG. 1, in accordance with one or more example embodiments of the present disclosure.

Referring to FIG. 4, the container 100 may include a sensor 402 for detecting the presence of a magnet of the self-closing lid 102 (e.g., a magnet shown in FIG. 7 on the bottom portion of the portion 104). When the sensor 402 detects the presence of the magnet, such may indicate that the self-closing lid 102 is closed (e.g., as opposed to being open when the portion 104 may be moved away from the sensor 402). Detection of the self-closing lid 102 being closed may allow for automated locking of the self-closing lid 102 by the container 100.

Figure 5:
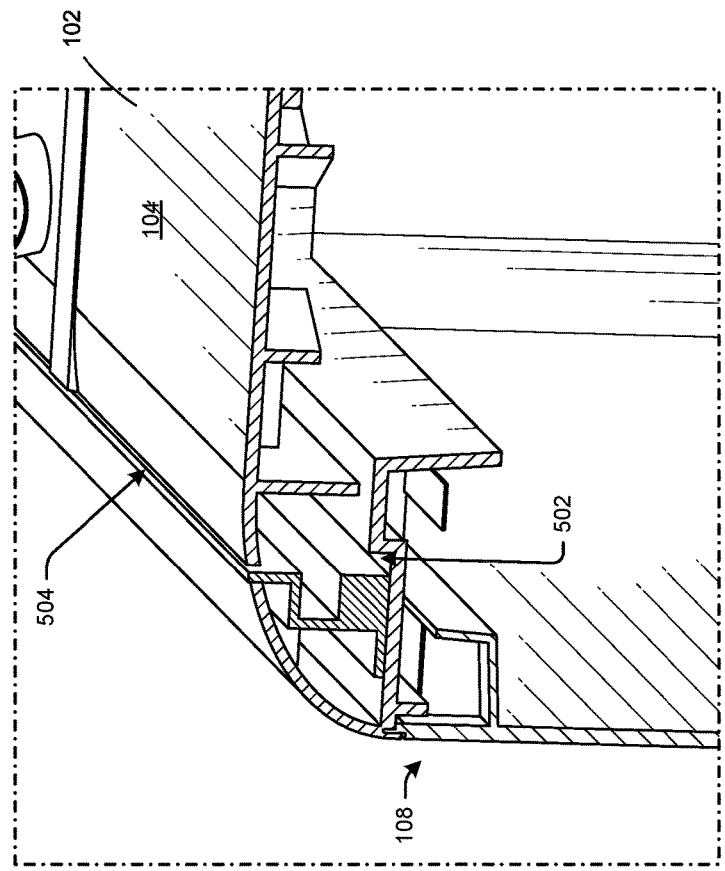
FIG. 5 illustrates a cutaway view of a portion of the self-closing lid of FIG. 1, in accordance with one or more example embodiments of the present disclosure.

FIG. 5 illustrates a cutaway view of a portion of the self-closing lid 102 of FIG. 1, in accordance with one or more example embodiments of the present disclosure.

Referring to FIG. 5, the self-closing lid 102 may include a gutter system 502 for receiving liquid run-off from the self-closing lid 102 as the self-closing lid 102 opens (e.g., because the portion 104 may lift at an angle when opening). The gutter system 502 may represent a recess in the container 100 axially aligned and below the edge 504 of the portion 104 where the portion 104 lifts and rotates (e.g., about the hinge 210 of FIG. 2, removed from FIG. 5).

Figure 6:
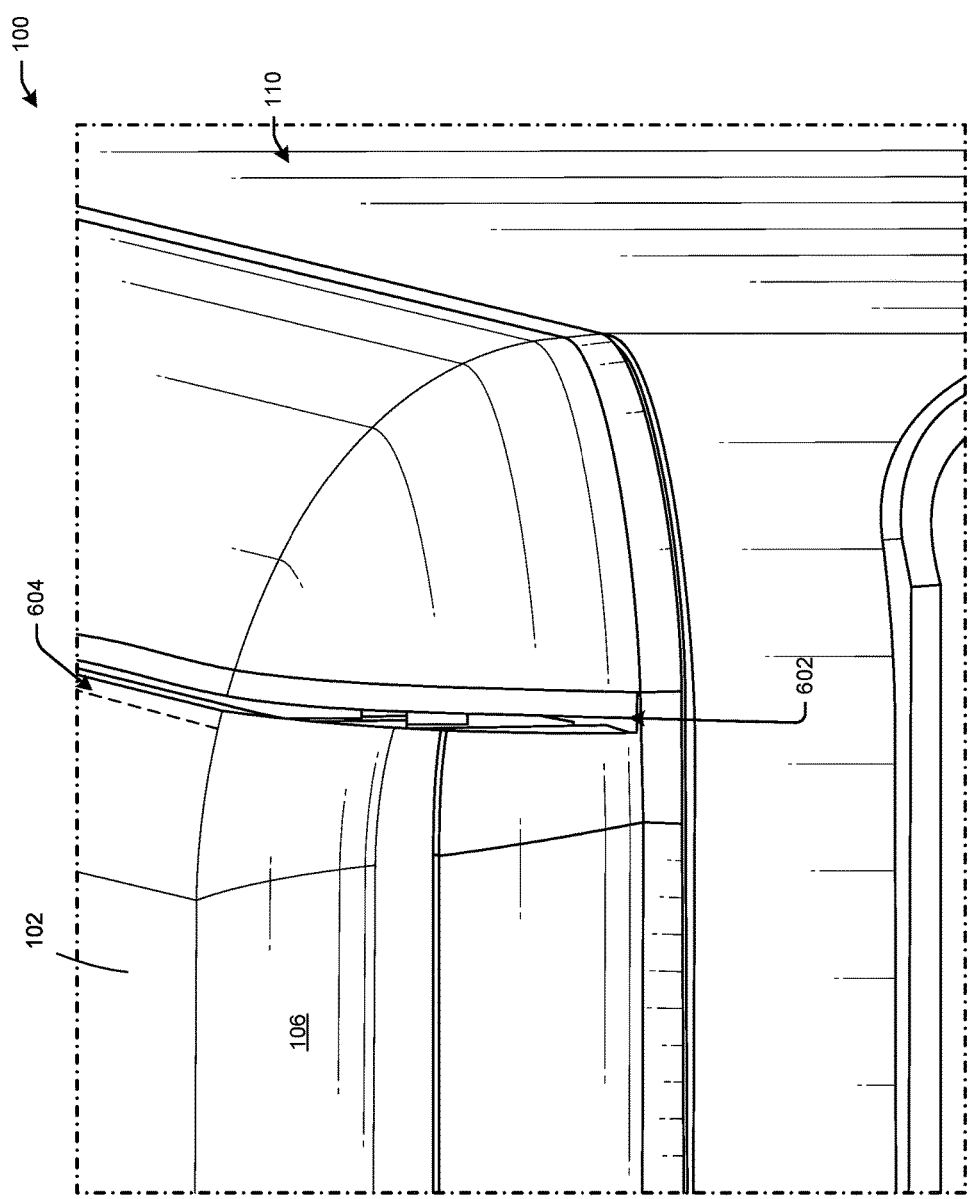
FIG. 6 illustrates a perspective view of a portion of the self-closing lid of FIG. 1, in accordance with one or more example embodiments of the present disclosure.

FIG. 6 illustrates a perspective view of a portion of the self-closing lid 102 of FIG. 1, in accordance with one or more example embodiments of the present disclosure.

Referring to FIG. 6, a gutter system 602 may replicate the gutter system 502 of FIG. 5, configured to receive liquid run-off from the portion 106 of the self-closing lid 102 as the portion 106 lifts and slides from the closed position to the open position (e.g., as shown in FIG. 1). The self-closing lid 102 also may include a lip 604 to catch liquid run-off from the portion 106.

FIG. 7 illustrates a perspective view of a portion of the self-closing lid 102 of FIG. 1, in accordance with one or more example embodiments of the present disclosure.

Referring to FIG. 7, a magnet on the bottom of the portion 104 of the self-closing lid 102 is shown, along with the sensor 402 of FIG. 4. As described above with respect to FIG. 4, when the magnet 702 is proximal (e.g., within a threshold distance of) the sensor 402, the sensor 402 may detect that the self-closing lid 102 is closed. As the self-closing lid 102 opens (e.g., as shown in FIG. 1), the magnet 702 may move away from the sensor 402, indicating that the self-closing lid 102 is open. The sensor 402 may be integrated with processing circuitry to determine based on the sensor data whether the self-closing lid 102 is opened or closed. In some examples, a different sensor that can detect the door position can also be used. For instance, a potentiometer or hall effect sensor located at one or more joints could be used to detect whether lid 102 is fully opened, fully closed or at some point in between.

Figure 8:
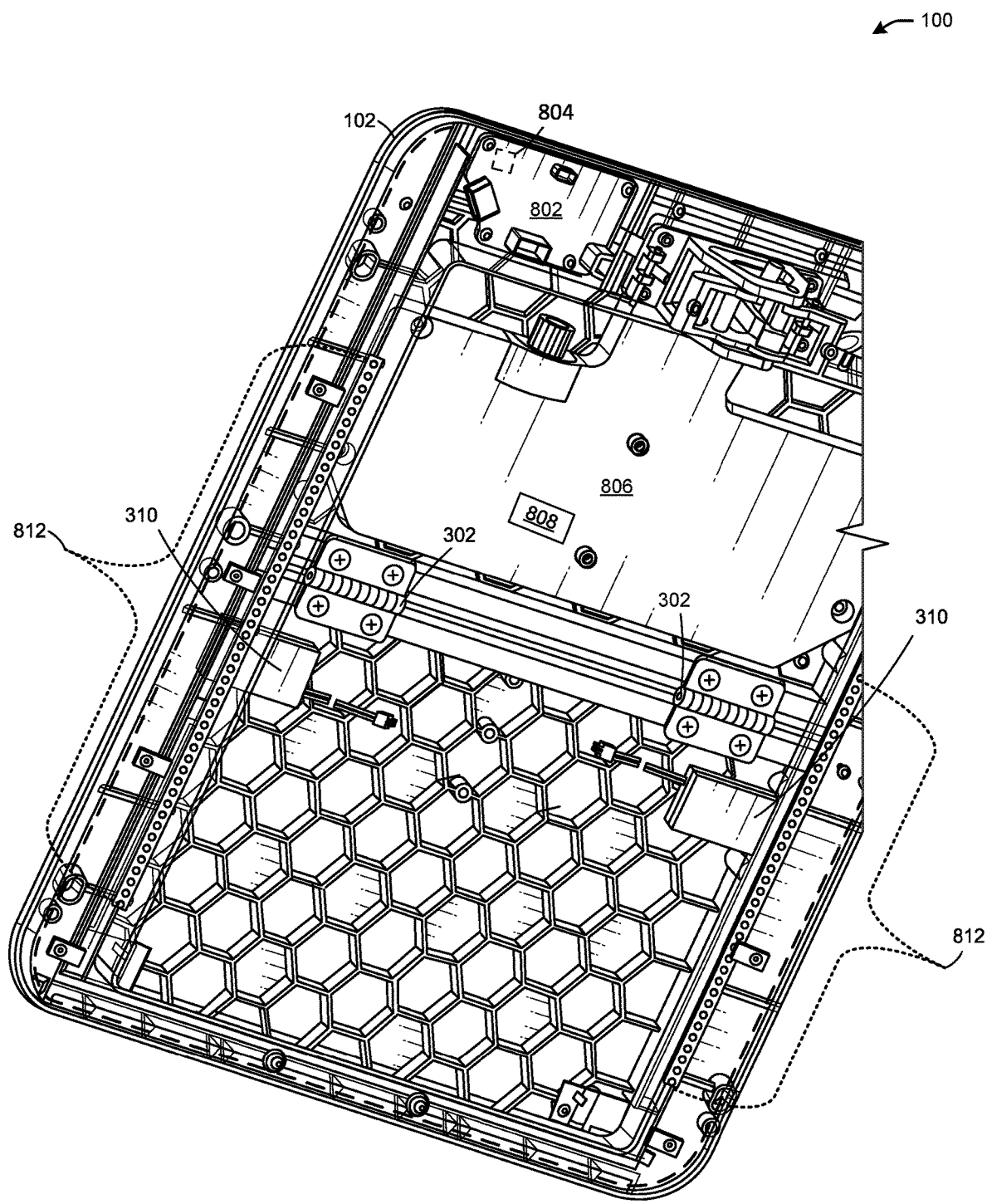
FIG. 8 illustrates a perspective view of a bottom portion of the self-closing lid of FIG. 1, in accordance with one or more example embodiments of the present disclosure.

FIG. 8 illustrates a perspective view of a bottom portion of the self-closing lid 102 of FIG. 1, in accordance with one or more example embodiments of the present disclosure.

Referring to FIG. 8, a circuit board 802 may be operatively attached to the self-closing lid 102, and may include a sensor 804 capable of detecting the magnet 208 of FIG. 2. In this manner, the sensor 804 may detect when the self-closing lid 102 is closed because the magnet 208 may be proximal to (e.g., within a threshold distance of) the sensor 804, and when the self-closing lid 102 is open because the magnet may move away from the sensor 804 as the self-closing lid 102 opens (e.g., as shown in FIGS. 1 and 2). The sensor 804 may be integrated with processing circuitry to determine whether the self-closing lid 102 is open or closed, and/or the angle at which the portion 104 of the self-closing lid 102 is oriented when open (e.g., FIG. 1). Also shown in FIG. 8 is the locking mechanism 310 of FIG. 3.

Still referring to FIG. 8, the self-closing lid 102 may include a circuit board 806 with communications circuitry 808 (e.g., wireless transceivers, radios, and antennae) for wireless communications. The communications circuitry 808 may be used to communicate the location of the container 100 and the status of the container 100 (e.g., whether the self-closing lid 102 has been opened and closed at a delivery location, indicating that a delivery has completed). Also shown in FIG. 8 are the hinges 302 that allow folding of the self-closing lid 102 as it opens (e.g., FIG. 1). The self-closing lid 102 also may include lights 812 (e.g., arrays of light emitting diodes or other lights) to light the interior of the cargo bay 150 of FIG. 1.

In one or more embodiments, material of the self-closing lid 102 above the circuit board 806 may include polypropylene or other materials that may avoid blocking or causing interference for wireless communications (e.g., from the communications circuitry 808).

The communications circuitry 808 may be configured to communicate via a communications network, wirelessly or wired (e.g., the same or different wireless communications networks). The communications network may include, but is not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network may have any suitable communication range associated therewith and may include, for example, global networks (e.g., the Internet), metropolitan area networks (MANs), wide area networks (WANs), local area networks (LANs), or personal area networks (PANs). In addition, the communications network may include any type of medium over which network traffic may be carried including, but not limited to, optical fiber, radio frequency communication mediums, white space communication mediums, ultra-high frequency communication mediums, satellite communication mediums, or any combination thereof.

Figure 9:
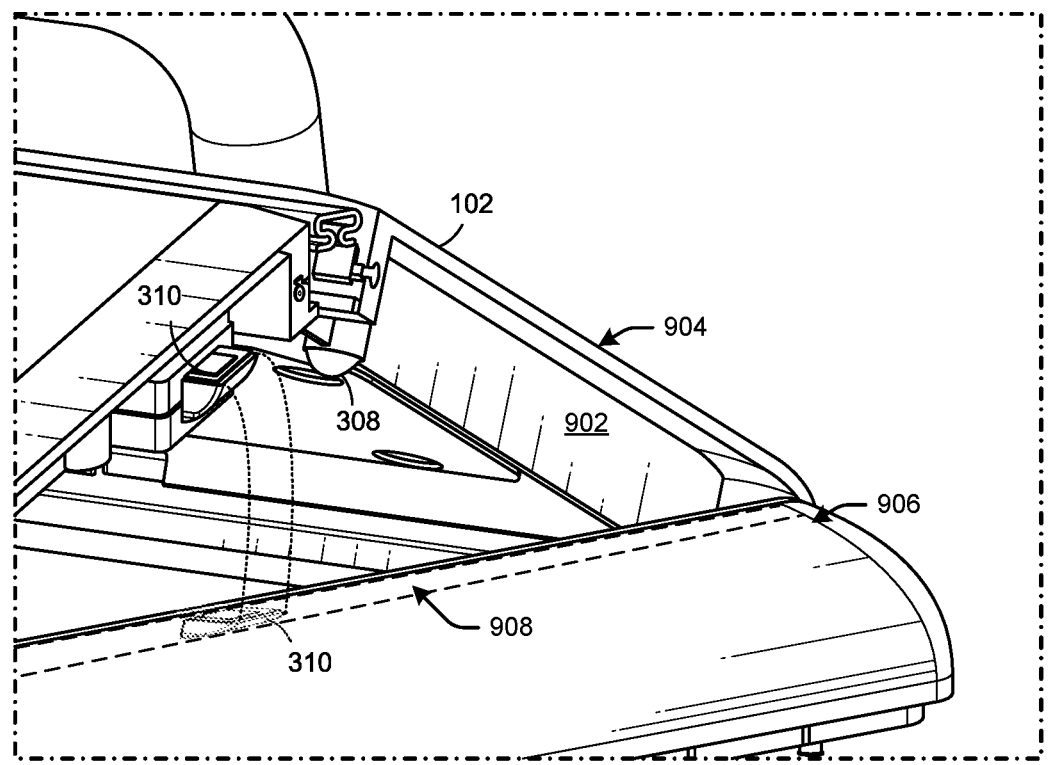
FIG. 9 illustrates a perspective view of a portion of the self-closing lid of FIG. 1, in accordance with one or more example embodiments of the present disclosure.

FIG. 9 illustrates a perspective view of a portion of the self-closing lid 102 of FIG. 1, in accordance with one or more example embodiments of the present disclosure.

Referring to FIG. 9, the self-closing lid 102 may reduce the chances of pinches as the self-closing lid 102 closes. For example, as shown, a vertical surface 902 underneath a top surface 904 of the self-closing lid 102 may be recessed rather than positioned at the outer edge of the top surface 904. In this manner, a person is less likely to experience a pinch if their finger is between the top surface 904 and a side portion 906 of the container 100 as the self-closing lid 102 closes. The locking mechanism 310 of FIG. 3 is shown, along with a way in which it may fit within a channel 908 of the container 100 (e.g., when the self-closing lid 102 is closed).

Figure 10A:
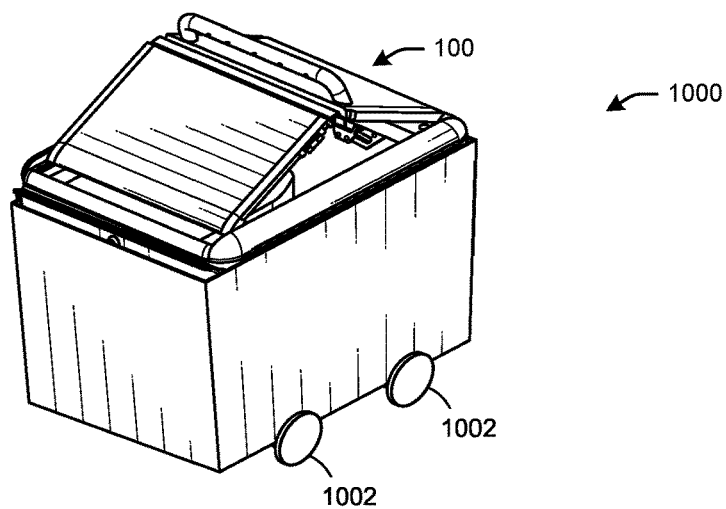
FIG. 10A illustrates an example schematic view of an autonomous robot including the container of FIG. 1, in accordance with one or more example embodiments of the present disclosure.

FIG. 10A illustrates an example schematic view of an autonomous robot 1000 including the container 100 of FIG. 1, in accordance with one or more example embodiments of the present disclosure.

Referring to FIG. 1 and FIG. 10A, the container 100 may be integrated into an autonomous robot 1000 or other autonomous vehicle. The autonomous robot 1000 may have wheels 1002 (e.g., mounted on axles and rotated by one or more motors) to allow the autonomous robot 1000 to travel. For example, the autonomous robot 1000 may four of the wheels 1002, or a different number of the wheels 1002, for example two rows of three wheels, three rows with four wheels in each row, and so on. Also, different wheels may have different functions; for example, one or more wheels may be drive wheels, one or more wheels may be steerable wheels, and one or more wheels may be free-rolling wheels. The autonomous robot 1000 may include at least one drive motor for driving the wheels, communications and control components (e.g., the communications circuitry 808 of FIG. 8) that may communicate (e.g., via wireless communications) with external devices and control motions and actions of the autonomous robot 1000 (e.g., autonomously or under remote control), and one or more sensors that may, for example sense the current location of the autonomous robot 1000. Communications and control components may include at least one computing device, which may store computer code and data for controlling the autonomous robot 1000. The sensors 402 (FIG. 4) and 804 (FIG. 8) may include optical sensors, tactile sensors, and/or other types of sensors. The autonomous robot 1000 may also include at least one power supply and/or connection for connecting to an external power source. In some embodiments, the power supply may be or may include a rechargeable battery.

Figure 10B:
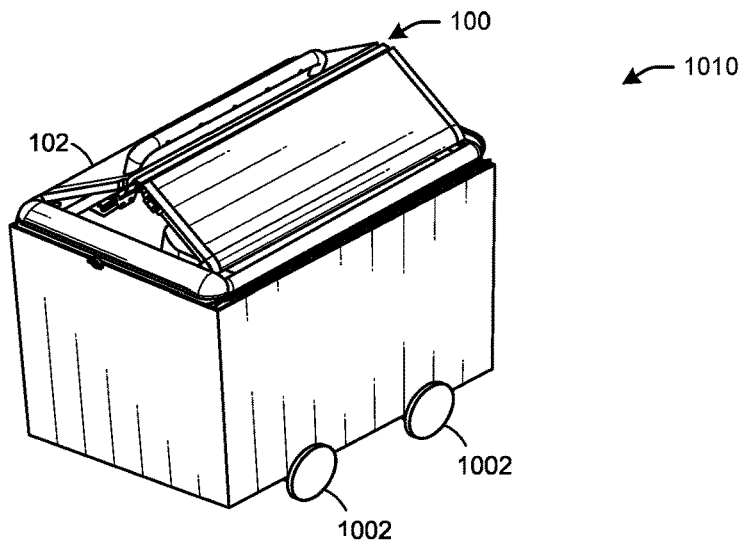
FIG. 10B illustrates an example schematic view of an autonomous robot including the container of FIG. 1, in accordance with one or more example embodiments of the present disclosure.

FIG. 10B illustrates an example schematic view of an autonomous robot 1010 including the container 100 of FIG. 1, in accordance with one or more example embodiments of the present disclosure.

Figure 10C:
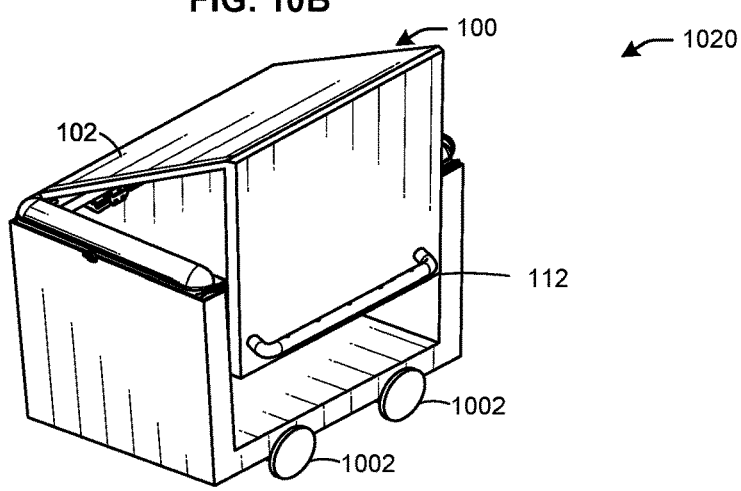
FIG. 10C illustrates an example schematic view of an autonomous robot including the container of FIG. 1, in accordance with one or more example embodiments of the present disclosure.

FIG. 10C illustrates an example schematic view of an autonomous robot 1020 including the container 100 of FIG. 1, in accordance with one or more example embodiments of the present disclosure.

Referring to FIG. 10B, the autonomous robot 1010 may be the same as the autonomous robot 1000 of FIG. 10A, but with the container 100 oriented differently. In particular, the self-closing lid 102 may be rotated 90 degrees so that the center hinge (e.g., the hinges 302 of FIG. 3) of the self-closing lid 102 extends from front-to-back of the autonomous robot 1010 (e.g., as opposed to extending from side-to-side of the autonomous robot 1000).

Referring to FIG. 10C, the autonomous robot 1020 may be the same as the autonomous robot 1000 of FIG. 10A, but with the container 100 oriented differently (and the handle 112 optionally on the side of the container 100 as shown). In particular, the center hinge (e.g., the hinges 302 of FIG. 3) of the self-closing lid 102 may be more proximate to a side of the autonomous robot 1020 rather than in the center of the self-closing lid 102. In this manner, the portion 106 of the self-closing lid 102 may hang down the side of the autonomous robot 1020 when closed (e.g., not co-planar with the portion 104 of the self-closing lid 102).

The autonomous robots 1000, 1010, and 1020 may include other components, for example video cameras, audible alarms, external lights, access panels, external controls such as on/off buttons, antennas, and Radio Frequency Identifier (RFID) devices. For example, the autonomous robots 1000, 1010, and 1020 may include a radio frequency identifier (RFID) tag that uniquely identifies the autonomous robots 1000, 1010, and 1020. However, other techniques or devices may be used to uniquely identify the autonomous r robots 1000, 1010, and 1020. For example, during a picking operation, an agent within the materials handling facility may scan the bar code of the delivery container and scan a bar code or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the transportation vehicle to be transported with the item when it is delivered by an AGV, or otherwise made available to a user.

The autonomous robots 1000, 1010, and 1020 may be referred to as an autonomous ground vehicle (AGV). The AGV may access information about its surrounding environment, such as maps of streets, sidewalks, and buildings, building interiors, and the like, detect people, obstacles (such as curbs, steps, bumps, slopes, and the like), objects (such as landscaping, gates, and the like), and surfaces (such as lawns, cobblestones, sidewalk cracks and discontinuities, and the like), evaluate and take action based on the detection, and travel under its own power to waypoints, usually by battery power and without human navigation assistance, taking into account the above information and detection. In some circumstances, an AGV's onboard control system may be able to autonomously learn, such as adjusting strategies based on input about the surroundings, adapt to surroundings without outside assistance, and the like.

In various implementations, AGVs may be owned by individual users and/or may service a group of users in a given area (e.g., in an apartment building, neighborhood, etc.). In various implementations, AGVs may be stationed at various types of locations (e.g., inside or outside of user residences, common areas, etc.) and may travel (e.g., to a street) to meet a transportation vehicle (e.g., a delivery truck) that is carrying items. For example, a notification may be received indicating that a transportation vehicle is expected to arrive at a designated meeting location (e.g., on a street) at a particular time. As another example, various types of sensors (e.g., image sensors, sound sensors, etc.) may be utilized to determine when a transportation vehicle is approaching an area (e.g., an ice cream truck may play a sound when approaching, etc.). In response to an approaching transportation vehicle, one or more AGVs may travel out to the meeting location to receive items from the transportation vehicle. In one configuration, a starting travel time may be established for an AGV to begin travel toward the meeting location so that the AGV may arrive ahead of the transportation vehicle. The determination of the starting travel time may be based at least in part on an estimated time of when the transportation vehicle is expected to arrive at the meeting location.

In various implementations, AGVs may have various capabilities for navigating to and from transportation vehicles, delivery locations, etc. For example, an AGV may include various sensors and devices (e.g., imaging sensors, proximity sensors, GPS capabilities, etc.) to assist with navigation. In various implementations, an AGV may also include one or more access mechanisms to assist with opening access barriers (e.g., doors, gates, etc.) that the AGV may encounter on a travel path (e.g., on the way to a meeting location, delivery location, etc.). For example, an access mechanism may include a transmitter device that transmits a garage door opener signal to allow the AGV to open and close a garage door for exiting and/or entering a garage. As another example, a specialized door (e.g., sized to fit the AGV) may include a locking and/or opening mechanism that is triggered by an access mechanism of the AGV. In accordance with such access techniques and other capabilities of AGVs, it will be appreciated that an item may be received and delivered by an AGV without requiring a user to be home. In addition, an AGV may receive and deliver an item when a user is busy or otherwise unavailable (e.g., when a user is on a phone call, sleeping, etc.). Items may also be received and delivered by AGVs at times that may be more conducive for deliveries (e.g., between 2:00 a.m. and 6:00 a.m., etc.).

In various implementations, when a group of AGVs is congregating at a meeting location for meeting a transportation vehicle, the positions of the AGVs may be coordinated so that the AGVs are in a designated order at the meeting location. For example, when an AGV is at a meeting location, if another AGV is determined to be present (e.g., utilizing various sensors of the AGVs and/or as indicated by a central management system, etc.), one or both of the AGVs may be instructed to move relative to the other according to a designated order. In various implementations, the designated order may be determined according to various organizational methods. For example, the AGVs may be arranged to be lined up in an order according to the delivery addresses where the AGVs will be delivering items. As another example, the AGVs may be arranged in an order according to an arranged order of items that are stored in a transportation vehicle. It will be appreciated that such arrangements of AGVs at the meeting location may simplify the transfer of items from the transportation vehicle to the AGVs. In various implementations, the AGVs may also include markings or other identifying symbols or devices (e.g., flashing lights, sounds, etc.) for simplifying the identification and transfer of corresponding items from the transportation vehicle.

In various implementations, after an item from a transportation vehicle is placed in a storage compartment of an AGV, the storage compartment may be locked while the AGV travels to a delivery location (e.g., at a user's residence). At the delivery location, a user may interact with a user interface of the AGV, or an access code or signal may otherwise be provided, to unlock the storage compartment. In a configuration where an AGV has multiple storage compartments for delivering multiple orders, a separate access code or other mechanism may be utilized for each of the storage compartments, so that each user may only access or otherwise receive the item(s) that are part of their order. In certain implementations, an AGV with multiple storage compartments may also receive items from multiple transportation vehicles or other sources (e.g., wherein the items are locked in different storage compartments), before the AGV delivers the items to one or more delivery locations.

Regardless of the type of the container 100 used, in some implementations, some types of items can be transported in the container 100 without needing to be packed in a shipping package inside the container 100. In other instances, items that are either pre-packaged, fragile, or need additional protection prior to transport may be picked and packed in a shipping package. In another implementation, items may be put into bags prior to placement in the container 100 and/or storage areas to provide confidentiality of the ordered items. In addition, items from multiple shipment sets to be transported by the same transportation vehicle may be picked into the same container 100 for transport.

An AGV may be sized and shaped to be drivable on a standard sidewalk or road, and to fit within a doorway or other access point (e.g., of a user's residence, etc.). The container 100 may be sized according to various factors (e.g., to match the size of packaged items).

Various sensors may be mounted to an AGV. The sensors may be of various types. In general, certain sensors may be utilized to assist with the navigation, object sense and avoid, etc. of the AGV. For example, the sensors may include imaging sensors and/or distance detection sensors for measuring and monitoring the distance between the AGV and other objects (e.g., an obstacle, a roadway, another AGV, etc.).

An AGV also may include one or more power modules. In this example, the autonomous robots 1000, 1010, and 1020 may include a power module that is removably mounted at the bottom of the autonomous robots 1000, 1010, and 1020. The power module for the autonomous robots 1000, 1010, and 1020 may be in the form of battery power, solar power, gas power, super capacitor, fuel cell, alternative power generation source, or a combination thereof. The power module is coupled to and provides power for the a control system and the motor(s) of the propulsion system, as well as any other attached input/output devices, etc. The power module stores energy with a corresponding energy level. In various implementations, the stored energy level of the power module may be recharged through various techniques. For example, when the autonomous robots 1000, 1010, and 1020 is at a home base location or other location, the autonomous robots 1000, 1010, and 1020 may engage with a charging component that will recharge the power module. As another example, the autonomous robots 1000, 1010, and 1020 may also or alternatively utilize other techniques for recharging (e.g., utilizing sunlight to recharge through solar panels, etc.). In addition, in some implementations, a power module may be configured such that it can be autonomously removed and/or replaced with another power module while the autonomous robot 1000 is at a home base location or other location.

In various implementations, the autonomous robot 1000 may also include an item engagement mechanism. For example, the item engagement mechanism may include a robotic arm or other mechanism that may be utilized to engage an item for placement in the container 100, or for removing an item from the container 100 when the item is being delivered to a delivery location. The item engagement mechanism may communicate with (via wired or wireless communication) and be controlled by the communications circuitry 808. In various implementations, such item engagement mechanisms may also or alternatively be included in a transportation vehicle, home base location, meeting location, user's residence, etc. for placing items in and/or removing items from the container 100.

The AGV control system (e.g., the circuit board 806) maintains information as to whether a storage compartment of the autonomous robots 1000, 1010, and 1020 is empty or includes items, the access code(s) or other identifier(s) necessary to open the storage compartment and any other information necessary to maintain the autonomous robots 1000, 1010, and 1020. The AGV control system may also lock/unlock the self-closing lid 102, activate sensors, and the like. The autonomous robots 1000, 1010, and 1020 may be able to obtain information from a remote computing resource or may be configured to operate primarily as a stand-alone unit, with limited external communication to receive/provide order/delivery/transfer information. The AGV control system may include a component (e.g., the communications circuitry 808) to provide wired and/or wireless network connectivity (e.g., with computing resources in a user device, remote computing resources, etc.). Wireless connectivity may be implemented using a wireless antenna (not shown), which may provide both receive and transmit functionality.

The autonomous robots 1000, 1010, and 1020 may also include a user interface to receive and provide information to a user of the autonomous robots 1000, 1010, and 1020, and may include, but is not limited to, a display, such as a touch-screen display, a scanner, a keypad, a biometric scanner, an audio transducer, one or more speakers, one or more image capture sensors, such as a video camera, and any other types of input or output devices that may support interaction between the autonomous robots 1000, 1010, and 1020 and a user. In various implementations, the user interface may alternatively include more limited features. For example, in one implementation the user interface may only include a relatively small display and/or a keypad for providing input. In certain other implementations, these and other features may also be eliminated, wherein control of the autonomous robots 1000, 1010, and 1020 may primarily be provided remotely. For example, in order to access a storage compartment, a user may send or reply to a text message to or from a centralized remotely located control system (e.g., a central management system), which controls the autonomous robot 1000 to open the storage compartment door so that the user can retrieve an ordered item. In various implementations, the autonomous robots 1000, 1010, and 1020 may have capabilities for directly receiving such signals from a user device or other device (e.g., a device inside a user's residence) that provides a signal to open the storage compartment door.

In the example of FIG. 2A, the container 100 includes bottom and side surfaces and the self-closing lid 102 to form a cavity (e.g., the cargo bay 150) in which items may be stored. In addition, the container 100 may include various security or other components. For example, the cargo bay 150 may include a locking mechanism for locking and unlocking the self-closing lid 102, which may be controlled directly or remotely by the control system.

In various implementations, a locking mechanism of the container 100 may be controlled by the AGV control system, either through wired or wireless communication, to effect locking and unlocking of the self-closing lid 102. For example, when a user, carrier, etc. interacts with the user interface (e.g., via the display, or with a user device, etc.) and provides an access code or other identifier, the AGV control system may unlock the storage compartment. In a configuration in which the locking mechanism includes a pin holding the self-closing lid 102 closed, the AGV control system may activate the locking mechanism such that the pin retracts, thereby disengaging the lock of the container 100, allowing the self-closing lid 102 to open.

In addition to the use of retractable pins, any mechanical, magnetic, electrical or other form of locking mechanism may be utilized with the various implementations described herein. In addition, the container may also include magnets (e.g., the magnet 208 of FIG. 2, the magnet 702 of FIG. 7) to help close the self-closing lid 102. Moreover, while the above example describes the AGV control system controlling the locking mechanism, in other implementations, the container 100 may also or alternatively be controlled and/or communicated with directly by a command component and/or remote computing resources, etc.

The container 100 may also include an image capture sensor, such as a camera, and optionally an illumination component, such as a light emitting diode (LED), that may be used to illuminate the inside of the cargo bay 150. The image capture sensor may also be used to capture images or and/or detect the presence or absence of items within the cargo bay 150. For example, the image capture sensor may be used to capture images to identify the type of object located within the cargo bay 150 and/or to identify or record video/images of access within the cargo bay 150. In various implementations, the sensor and/or a separate item identification sensor may include a bar code scanner or other technology that is utilized to determine an identification of an item that is being placed, or has been placed, in the cargo bay 150. For example, a sensor including a bar code scanner or other identification technology may be located with or as part of the other sensors, on the self-closing lid 102, as part of the user interface, or otherwise positioned so as to scan or otherwise identify an item as it is being placed or is otherwise within the cargo bay 150 Such identification and/or images, video etc. may be recorded by the system and/or transmitted, and/or may be provided to a user to identify what items have been placed in the cargo bay 150 for delivery. For example, a user may wish to receive a message and/or image indicating what items are being delivered.

Some storage compartments of the cargo bay 150 may be refrigerated storage compartments. In various implementations, such refrigerated storage compartments may include their own cooling mechanisms and/or the autonomous robot 1000 may have a centralized cooling system. The temperature of previously non-refrigerated storage compartments may be adjusted to become refrigerated storage compartments, and vice versa. In an implementation with multiple refrigerated storage compartments, the temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in refrigerated storage compartments.

In various implementations, the temperatures in the refrigerated storage compartments may be adjusted when items are to be placed into the refrigerated storage compartments, or may be adjusted in advance. For example, when a refrigerated item is scheduled to be placed into a refrigerated storage compartment of an AGV, the temperature of the refrigerated storage compartment may be adjusted to a temperature that is specified for the refrigerated item in advance so that the refrigerated storage compartment will already be at the specified temperature when the item is placed into the refrigerated storage compartment. In one implementation, the image capture sensor may be used to capture an image of an item when it is placed into a storage compartment in order to try to determine an appropriate storage temperature for the item. For example, an item may have information on a label which identifies a storage temperature, such as "contents to be stored at 32 degrees F. or lower."

The temperatures in some or all of the refrigerated storage compartments may be controlled by the AGV control system. Continuous monitoring and regulating of the temperatures of the refrigerated storage compartments in which such items are kept may be important for verifying the condition of the items. Temperature sensors, such as the temperature sensor of the cargo bay 150, may be utilized for sensing the temperature for monitoring and regulating the temperature inside the refrigerated storage compartment. The refrigerated storage compartment and/or the entire autonomous robot 1000 may be insulated to prevent the dissipation of the cooled air from the refrigerated storage compartment.

In various implementations, a refrigerated storage compartment may be an insulated storage compartment which is cooled by passive cooling elements that are placed within the storage compartment. For example, rather than utilizing an active cooling system which may have components such as compressors and coils, the storage compartment may be cooled by passive cooling elements such as cold packs, frozen water bottles, etc. In one implementation, the passive cooling elements may be added to the storage compartment when the item is first placed into the storage compartment, such as at a meeting location. In another implementation, the passive cooling elements may be included in a shipping container with an item at a materials handling facility when it is shipped to be delivered by an AGV. In an alternative implementation, the passive cooling elements may be added to the insulated storage compartment with the item when it arrives or is otherwise placed in the storage compartment.

In various implementations, the number of passive cooling elements to be included with an item may be calculated based on a number of factors. For example, one factor may be an estimated maximum period of time that the item may remain in the storage compartment before it is retrieved by a user. Another factor may be the expected ambient temperature at the AGV and/or during transport to the meeting location with the AGV. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In various implementations, the autonomous robots 1000, 1010, and 1020 may also include a locator device (e.g., part of the circuit board 800) that is configured to assist with finding the autonomous robots 1000, 1010, and 1020 (e.g., when a transportation vehicle is searching for an AGV which is to receive an item, when a user is wanting an update on the location of an AGV that is delivering an item, etc.). For example, the locator device may wirelessly transmit an electronic signal that enables the position of the autonomous robots 1000, 1010, and 1020 to be tracked and/or otherwise determined (e.g., as indicated on a screen of a mobile electronic device, etc.). As another example, the locator device may emit various sounds, activate lights, etc. (e.g., to assist a carrier who is delivering items to multiple AGVs to determine which AGV is the correct AGV for a current item). In various implementations, the locator device may be controlled by the AGV control system and/or a central management system, etc. In various implementations, the autonomous robots 1000, 1010, and 1020 may also include an RFID tag, a printed circuit board, or any other object or mechanism that may be detectable and used to identify the autonomous robots 1000, 1010, and 1020 for security or other purposes (e.g., by a transportation vehicle, at an access point into a user's residence, etc.).

The descriptions herein are not meant to be limiting.

Various embodiments of the described circuitry of the container 100 may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The communications circuitry 808 of FIG. 8 may use any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the communications circuitry 808 may include one or more physical jacks (e.g., Ethernet, coaxial, or phone jacks) or one or more antennas to connect to a communications network. In an example, the communications circuitry 808 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments of the communications circuitry 808 may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments of the communications circuitry 808 may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could." "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An autonomous delivery robot comprising a container, the container comprising:
a cargo bay for holding items;
a bi-folding lid configured to slide from a closed position to an open position relative to the cargo bay, and from the open position to the closed position without human interaction;
a check strap operatively connected to the bi-folding lid and configured to move vertically in a first direction toward the bi-folding lid as the bi-folding lid slides from the closed position to the open position, and to move vertically in a second direction opposite the first direction as the bi-folding lid slides from the open position to the closed position; and
interlocking arms operatively attached to rollers and to one or more tension devices,
wherein when the check strap moves vertically in the first direction, the check strap is configured to separate the rollers and cause the interlocking arms to pull the one or more tension devices by causing first rotation of the interlocking arms, and
wherein when the check strap moves vertically in the second direction, the one or more tension devices are configured to cause second rotation of the interlocking arms, the second rotation opposite the first rotation.

2. The autonomous delivery robot of claim 1, wherein the check strap comprises a curved profile associated with providing a detent with which to maintain separation of the rollers, and with limiting the opening of the bi-folding lid.

3. The autonomous delivery robot of claim 2, wherein the container further comprises:
a damper associated with controlling the sliding of the bi-folding lid from the open position to the closed position.

4. The autonomous delivery robot of claim 1, wherein the one or more tension devices comprise at least one of a spring or an actuator.

5. A container comprising:
a cargo bay for holding items;
a lid configured to slide from a closed position to an open position relative to the cargo bay, and from the open position to the closed position;
a detent mechanism operatively connected to the lid and configured to move vertically in a first direction toward the lid as the lid slides from the closed position to the open position, and to move vertically in a second direction opposite the first direction as the lid slides from the open position to the closed position; and
arms operatively attached to rollers and to one or more tension devices,
wherein when the detent mechanism moves vertically in the first direction, the detent mechanism is configured to separate the rollers and cause the arms to pull the one or more tension devices by causing first rotation of the arms, and
wherein when the detent mechanism moves vertically in the second direction, the one or more tension devices are configured to cause second rotation of the arms, the second rotation opposite the first rotation.

6. The container of claim 5, wherein the container is associated with an autonomous robot.

7. The container of claim 5, wherein the detent mechanism comprises a curved profile associated with providing a detent with which to maintain separation of the rollers, and with limiting the opening of the lid.

8. The container of claim 7, wherein the container further comprises:
a damper associated with controlling the sliding of the lid from the open position to the closed position.

9. The container of claim 5, wherein the lid is a bi-folding lid is operatively connected to a first hinge operatively connected to the check strap, and to a second hinge dividing the bi-folding lid into two portions, and wherein the bi-folding lid further comprises a flexible seal associated with the second hinge.

10. The container of claim 5, wherein the one or more tension devices comprises a spring.

11. The container of claim 5, wherein the one or more tension devices comprises an actuator.

12. The container of claim 5, further comprising tracks associating with the sliding of the lid between the open position and the closed position, wherein a distance greater than zero separates the tracks from a side of the container proximal to a hinge operatively connected to the lid and to the check strap.

13. The container of claim 12, wherein the tracks are parallel to respective sides of the container.

14. The container of claim 12, wherein the tracks extend horizontally and vertically.

15. The container of claim 5, further comprising a gutter system associated with receiving liquid run-off from the lid as the lid slides from the closed position to the open position.

16. The container of claim 5, wherein the lid comprises a magnet, wherein the container further comprises a sensor associated with detecting the magnet, and wherein the container further comprises processing circuitry associated with determining that the lid is in the closed position based on the sensor detection of the magnet.

17. The container of claim 5, wherein the lid comprises a magnet, wherein the container further comprises a sensor associated with detecting the magnet, and wherein the container further comprises processing circuitry associated with determining an angle of the lid based on the sensor detection of the magnet.

18. The container of claim 5, wherein the lid comprises wireless communications circuitry, a polypropylene material, and lights associated with illuminating the cargo bay.

19. A delivery robot comprising a container, the container comprising:
- a cargo bay for holding items;
- a bi-folding lid configured to slide from a closed position to an open position relative to the cargo bay, and from the open position to the closed position; and
- a detent mechanism operatively connected to the bi-folding lid and configured to provide a hold-open force on the bi-folding lid when the bi-folding lid is at one or more open positions,
- wherein the detent mechanism is configured to move in a first direction toward the bi-folding lid as the bi-folding lid slides from the closed position to the open position, and to move in a second direction opposite the first direction as the bi-folding lid slides from the open position to the closed position; and further comprising:
- arms operatively attached to rollers and to one or more tension devices,
- wherein when the detent mechanism moves in the first direction, the detent mechanism is configured to separate the rollers and cause the arms to pull the one or more tension devices by causing first rotation of the arms, and
- wherein when the detent mechanism moves in the second direction, the one or more tension devices are configured to cause second rotation of the arms, the second rotation opposite the first rotation.

20. The container of claim 19, wherein the detent mechanism comprises a curved profile associated with providing a detent with which to maintain separation of the rollers, and with limiting the opening of the bi-folding lid.

* * * * *